US008561636B2

(12) United States Patent
Eithun

(10) Patent No.: US 8,561,636 B2
(45) Date of Patent: Oct. 22, 2013

(54) SYSTEM AND METHOD FOR LEAKAGE CONTROL AND/OR TESTING OF PIPING AND DISCHARGE POINTS FOR NON-COMPRESSIBLE FLUIDS

(75) Inventor: Vemund Eithun, Rennebu (NO)

(73) Assignee: Veit Holding AS, Rennebu (NO)

( * ) Notice: Subject to any disclaimer, the term of this patent is extended or adjusted under 35 U.S.C. 154(b) by 238 days.

(21) Appl. No.: 13/202,807

(22) PCT Filed: Feb. 18, 2010

(86) PCT No.: PCT/NO2010/000064
§ 371 (c)(1),
(2), (4) Date: Oct. 3, 2011

(87) PCT Pub. No.: WO2010/098671
PCT Pub. Date: Sep. 2, 2010

(65) Prior Publication Data
US 2012/0024397 A1    Feb. 2, 2012

(30) Foreign Application Priority Data

Feb. 24, 2009 (NO) .................................. 20090851

(51) Int. Cl.
*F16K 31/02* (2006.01)
(52) U.S. Cl.
USPC .............. 137/487.5; 137/624.12; 251/129.04; 73/40.5 R
(58) Field of Classification Search
USPC .................... 137/487.5, 487, 624.11, 624.12; 251/129.04; 73/40.5 R, 40
See application file for complete search history.

(56) References Cited

U.S. PATENT DOCUMENTS

| | | | | |
|---|---|---|---|---|
| 4,705,060 A * | 11/1987 | Goulbourne | | 137/102 |
| 5,347,264 A * | 9/1994 | Bjorkman | | 340/611 |
| 5,441,070 A * | 8/1995 | Thompson | | 137/1 |
| 5,568,825 A * | 10/1996 | Faulk | | 137/624.11 |
| 6,374,846 B1 * | 4/2002 | DeSmet | | 137/15.01 |
| 6,532,979 B1 * | 3/2003 | Richter | | 137/1 |
| 6,549,857 B2 * | 4/2003 | Fierro et al. | | 702/51 |
| 6,892,746 B2 * | 5/2005 | Ford | | 137/1 |
| 7,306,008 B2 * | 12/2007 | Tornay | | 137/624.11 |
| 7,574,896 B1 * | 8/2009 | Cooper | | 73/40.5 R |
| 2002/0120411 A1 | 8/2002 | Fierro et al. | | |
| 2004/0134545 A1 * | 7/2004 | Ford | | 137/624.11 |
| 2004/0206405 A1 * | 10/2004 | Smith et al. | | 137/624.12 |
| 2005/0072214 A1 | 4/2005 | Cooper | | |
| 2005/0224118 A1 | 10/2005 | Tornay | | |
| 2005/0252278 A1 | 11/2005 | Bryant et al. | | |
| 2010/0126610 A1 * | 5/2010 | Diprima | | 137/624.11 |
| 2010/0212748 A1 * | 8/2010 | Davidoff | | 137/10 |
| 2013/0092242 A1 * | 4/2013 | Guy | | 137/2 |

* cited by examiner

*Primary Examiner* — John Rivell
*Assistant Examiner* — Minh Le
(74) *Attorney, Agent, or Firm* — Ladas & Parry, LLP

(57) ABSTRACT

System and method for controlling leakage and/or testing of pipe systems and discharge points for incompressible fluids, said system including one or more automatic valve arrangements (10) arranged in a pipe system in connection with the fluid supply to a processing plant or building comprising rooms (16) having one or more discharge points (17) to open and close the fluid supply. The system includes a control device (13) provided with communication devices and arrangements (24) to detect activity in rooms (16) with discharge points (17) or the processing plant. The system comprises a pressure control arrangement (20) arranged between the automatic valve arrangement (10) and rooms (16) having discharge points (17) or the processing plant. The pressure control arrangement (20) is arranged for increasing the pressure in the pipe system.

13 Claims, 2 Drawing Sheets

Figure 1:
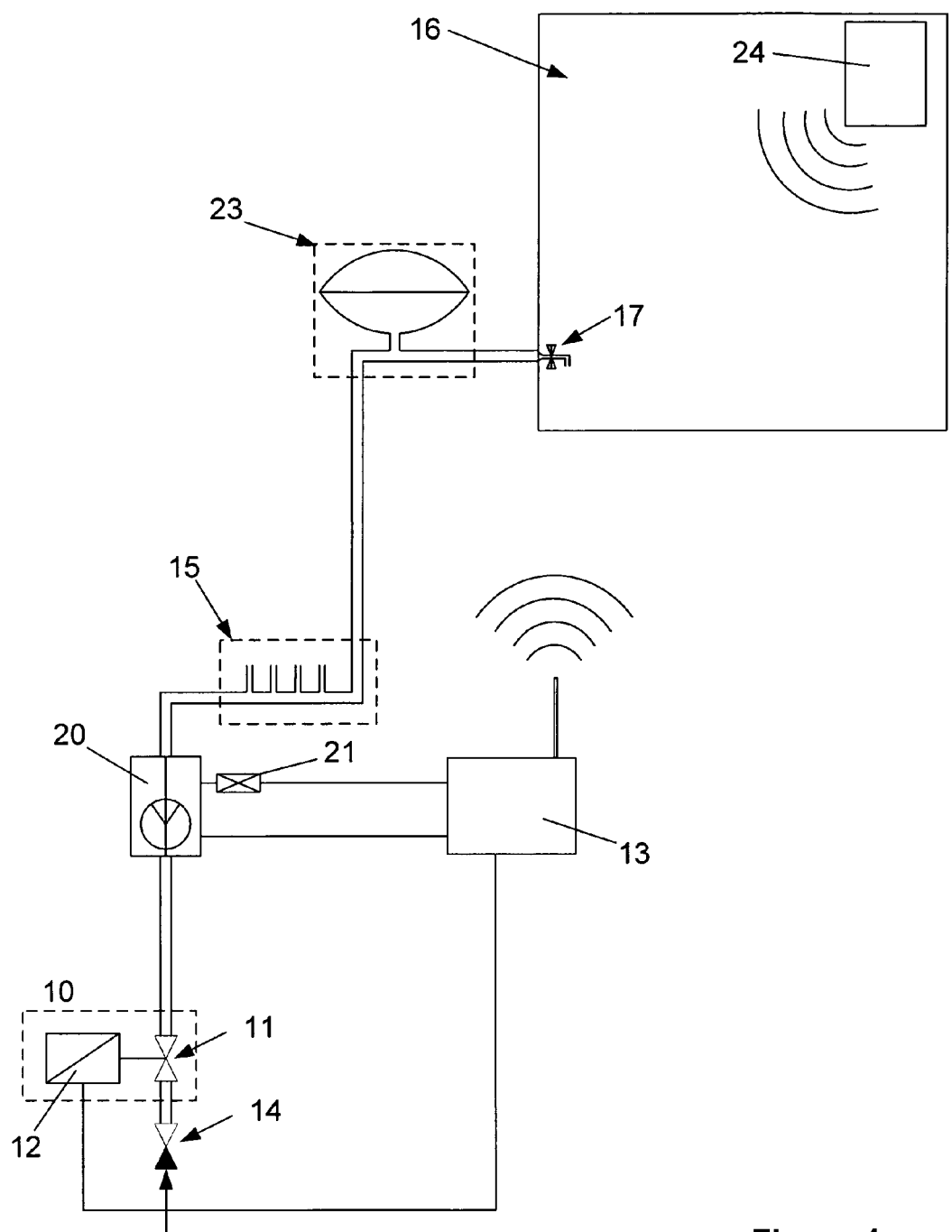

SYSTEM AND METHOD FOR LEAKAGE CONTROL AND/OR TESTING OF PIPING AND DISCHARGE POINTS FOR NON-COMPRESSIBLE FLUIDS

This application is a 371 of PCT/NO2010/000064 filed on Feb. 18, 2010, which is incorporated herein by reference.

The invention relates to a system for leakage control and/or testing of piping and discharge points for incompressible fluids according to the preamble of claim 1. The invention also relates to a method for leakage control and/or testing of piping and discharge points for incompressible fluids according to the preamble of claim 7.

BACKGROUND

Experience shows that the large water leakages are not always the ones resulting in the largest damages, but the small, where a few water drops are continuously discharged and then is allowed to remain hidden in walls or floors over several years and result in rot and fungus. It has also been an increasing problem with leakages where poor plumbing is the reason. Leakages also occur in many older buildings due to poor maintenance.

It is therefore a large demand for systems which are capable of detecting leakages at an early stage.

This was attempted solved in WO 9205385 which describes the use of a valve arrangement, which is connected to sensors in a room with discharge points, said sensors sending a signal to the valve arrangement which opens and closes the water supply dependent on whether persons are present in rooms with discharge points. Moreover, WO 9205385 describes the use of a pressure drop meter in order to detect leakages by comparing the pressure with a predefined value to determine whether there is a leakage or not. Using only the piping water pressure for pressure testing is not going to work over time, as one have natural leakages in piping, such as dripping from water taps, evaporation in cisterns and not at least expansions in plastic pipes in a modern pipe in pipe system. Temperature also plays an important role as water expands when heated. The hot water container is in most cases the fixed installation which affects the temperature in a pipe system the most. Most houses have a hot water container of about 120-300 liters, whereas industrial buildings, hotels and similar has one with a much higher capacity. A water container in an ordinary residence works within a temperature interval from +4 to +90 degrees. This temperature difference results in a substantial expansion in a pipe system with plastic pipes. When using the system described in WO 9205385, an expansion of this type will cause the system to detect this as a leakage and therefore produce a false alarm.

There is thus a need for a system which improves the disadvantages of the prior art.

OBJECT

The main object of the invention is to provide a method and a system of safe leakage control which improves or removes the disadvantages of prior art. It is also an object that the invention can be used in existing fluid supply systems as well as new fluid supply systems, including expanding pipes as well as non-expanding pipes.

It is an object of the invention to provide a system which is capable of detecting leakages in a pipe system at as early stadium as possible in order to avoid large damages. It is also an object to provide possibilities to capture natural pressure differences which arise in a pipe system to avoid false alarms.

THE INVENTION

A system for leakage control and/or testing of pipe systems and discharge points for incompressible fluids according to the invention is described in claim 1. Advantageous features of the system are described in claims 2-6.

A method for leakage control and/or testing of pipe systems and discharge points for incompressible fluids according to the invention is described in claim 7. Advantageous features of the method are described in claims 6-13.

A system according to the invention includes at least one automatic valve arrangement arranged in connection with the fluid supply of a pipe system, such as the water supply of a building, house, factory building, hotel or similar, said valve arrangement being arranged behind an optional main stop valve for fluid supply, such as the water supply. Moreover, the system includes one or more pressure control arrangements, such as a double-acting piston device, arranged between said one or more automatic valve arrangements and the discharge points of the pipe system, said pressure control arrangement being arranged to increase and reduce the pressure in a closed pipe system, between the valve arrangement and the discharge points of the pipe system. Moreover, the system includes one or more pressure measuring arrangements, such as a pressure cell or similar, arranged as a separate device or an integral part of the pressure control arrangement, to meter the pressure at any times in the course.

In order to perform pressure testing of a pipe system, it is absolutely necessary to be able to control the pressure in the pipe system, and as mentioned above, it is not possible to control this pressure only by means of the pipeline pressure/operating pressure, as the pipeline pressure/operating pressure has far to many differences and influences to provide an accurate measurement. Pipe installations for faucet water in a building are usually within the pressure class of PN10 or PN16. PN10 handles a pressure of 10 kg and PN16 a pressure of 16 kg. Normally the water pressure/operating pressure is within the interval of 1.7 to 5.5 kg, whereas the safety valve of a hot water container opens at 9 kg.

By means of a pressure control arrangement, such as a double-acting piston device, it is possible to provide an accurate control of the pressure within the walls of the building, and control the pressure up or down. Heating of a hot water container is a good example of the need of controlling the pressure up or down, and this pressure control can occur in a controlled manner by means of the pressure control arrangement.

Copper and steel pipes are usually replaced by plastic pipes (pex) in all new buildings and at larger renovations, and in connection with pressure tests in order to reveal leakages one must initially perform a pressure increase followed by a pressure reduction to stabilize the pressure and obtain a real test, due to one must capture expansions which occurs in plastic pipes.

It is easier to perform pressure testing of a pipe system consisting of non-expanding pipes to reveal leakages, such as copper pipes or steel pipes, because the pipe wall is not be affected by the pressure within the pipe. The challenge here is the presence of rapid pressure changes, due to the lack of expansion possibility, and since one is dealing with an incompressible medium which cannot be compressed. This can be solved by arranging an expansion tank or similar to the pipe system which allows for metering within a difference and at the same time allowing for a volume of leakage before the alarm sets off. Moreover, the expansion tank or similar can be made of two types of materials, either of an expandable material or of a non-expandable material. By using an expansion tank or similar of an expandable material, it is possible to obtain the same behavior as in a pipe system with expandable pipes. By using an expansion tank of a non-expandable material, the volume of "allowed" leakage equals the predefined volume of the expansion tank or similar. This is naturally taken into consideration in the interpretation of the pressure metering from the test. Moreover, it is important that the expansion tank or similar is arranged for through-put to avoid stationary water, since stationary water may result in bacterial growth.

As described above, the pressure must be able to be increased and reduced to provide a real metering of leakage; and the most important point is that the pressure is lowered to a pressure substantially below the operating pressure (e.g. 0.5 times the operating pressure) after a stable substantially higher pressure has been reached (e.g. 1.5 times the operating pressure). The initial pressure increase is maintained in a certain period of time in order to obtain a stable pressure, and provide expansion in plastic pipes. In cases where pipe systems includes non-expandable pipes, it is necessary to use an expansion tank or similar, as mentioned above. If the expansion tank or similar is formed by an expanding material, the same behavior is provided as with a pipe system of expanding pipes. By lowering the pressure to a pressure substantially below the operating pressure, the plastic pipes will contract, which results in increased pressure in the pipe system. For a pipe system of non-expanding pipes, the expansion tank will produce the same effect. After the pressure has been increased to a certain degree, the pressure will stabilize at a certain level after a certain period of time, provided that no leakage occurs. If there are leakages in the pipe system, the pressure will drop instead of stabilizing, which the system will capture and rise an alarm.

If the pipe system consists of non-expandable pipes and the expanding tank also consists of a non-expandable material, it is possible to decide weather a leakage is present by increasing the pressure and keep it stable within a certain period of time, and then examine the progress. If the pressure falls, a leakage is present.

The pressure control arrangement is for that reason a required device for the system to operate as intended.

It is important that the system is arranged so that one is able to select which type of material the pipe system is constructed of, as there are numerous variants, where plastic pipes is one example of a material which is expandable, whereas copper, aluminum, steel pipes and similar are examples of non-expandable materials. It is also important to be able to capture natural pressure changes which arise in a pipe system, and as mentioned above, temperature does also play an important role as water expands when heated, for example due to a hot water container. The pressure control arrangement in the system in according to the invention enables equalization of expansions caused by a hot water container.

An essential detail of the system according to the invention is also that the system operates with the water shut off during the pressure test, which removes the possibility of equalizing the pressure against the external pipe system, i.e. the municipal water supply, well or pump.

Moreover, the system includes a control device for controlling the system, which is provided with means and/or software to perform pressure tests by controlling the pressure control arrangement and valve arrangement, and provide metering of the present pressure at any times from the pressure measuring arrangement in order to reveal leakages. The control device is moreover provided with communication devices, such as SMS, e-mail, sound and/or light alerts on a remote control, control panel or similar, or a combination of more of these, to communicate with user and/or security company or similar to rise an alarm in case of a leakage. The control device can also be arranged to communicate with other control devices, such as power saving systems or similar.

Moreover, the control device is provided with a control panel and/or is arranged to communicate with a remote control for settings of the system.

Moreover, the control device can be arranged to communicate with a remote control or manual or automatic switches to state weather fixed installations, such as laundry machines, dishwashers or similar are active, to avoid the system to enter test mode when these are active.

Moreover, the system can preferably include one or more devices that indicates activity in rooms having a discharge point, such as movement sensors or similar.

The system is preferably arranged in a manner that the valve arrangement is closed when devices state that there is no activity in rooms with discharge points or that fixed installations, such as laundry machine, dish washer or similar, are inactive.

When the system has detected that there is no activity in rooms with discharge points or other activity that indicates water consumption, the valve arrangement is closed, preferably after a time delay, and the system can initiate a pressure test as described above, to examine whether there is any leakage in the pipe system. If it during a pressure test is detected that a room with discharge point is in use or an indication that fixed installations are active, the pressure test is terminated and the valve arrangement is reopened to provide normal water supply. The pressure test is so restarted after the system has detected that there is not activity in rooms with discharge points or that there are no indications that any fixed installation is active.

A method for leakage control and/or testing of pipe system and discharge points for incompressible fluids to reveal any leakage in the pipe system can be summarized by the following steps:

a) Continuously examining whether there is any activity in rooms having discharge points or whether there are any indications of fixed installations or processing plants are active, which indicates consumption of fluid, b) Close the valve arrangement if there are no indications of fluid consumption, c) Increase the pressure to a pressure substantially higher than the operating pressure and obtain a stable pressure within a certain period of time by means of the pressure control arrangement, and continuously measuring the pressure in the pipe system by means of a pressure measuring arrangement, d) Interpret the measured pressure in relation to predefined parameters to reveal any leakage, e) If the interpretation in step d) indicates that a leakage is present, close the valve arrangement and raise an alarm.

Step c) includes increasing the pressure to a predefined value is achieved, and maintaining the pressure stable within a certain period of time. If it is not possible to maintain a stable pressure, raise alarm as this indicates a leakage.

Moreover step c) can include a reduction of the pressure to a pressure substantially below the operating pressure by means of a pressure control arrangement and performing a continuous metering of the pressure in the pipe system by means of a pressure measuring arrangement. This is only applicable to pipe systems formed of expandable pipes or non-expandable pipes with an expansion tank or similar of an expandable material.

If the pipe system includes non-expandable pipes and a non-expandable expansion tank or similar, step c) does not include pressure reduction in the closed pipe system between valve and discharge points, to a pressure substantially lower than the operating pressure by means of a pressure control arrangement, and continuously measuring the pressure in the pipe system by means of a pressure measuring means.

Moreover step e) includes notifying a user, security company or similar about leakage by means of communication devices. Moreover, step e) can include closing of the valve arrangement only for a given period of time. Moreover, step e) can include repetition of step a)-d) several times to provide a better basis for interpretation prior to raising alarm.

Step a)-e) include that if activity arises in rooms with discharge points or activity of fixed installations or process plants, the method returns to step a) and the valve arrangement is set in an open state.

The method may further include continuously repetition of the steps a)-e) or execution of the steps a)-e) according to predefined conditions, such as a given time period during a day, etc.

Even though the abovementioned is based upon a pipe system for water supply, it should be obvious that the invention also can be used in connection with industrial processing processes/plants where incompressible fluids are used. Other examples of incompressible fluids in addition to water are oil of different kinds and most of the process fluids used in the process industry.

Further advantages and preferable features will appear from the following example description.

EXAMPLE

Figure 2:
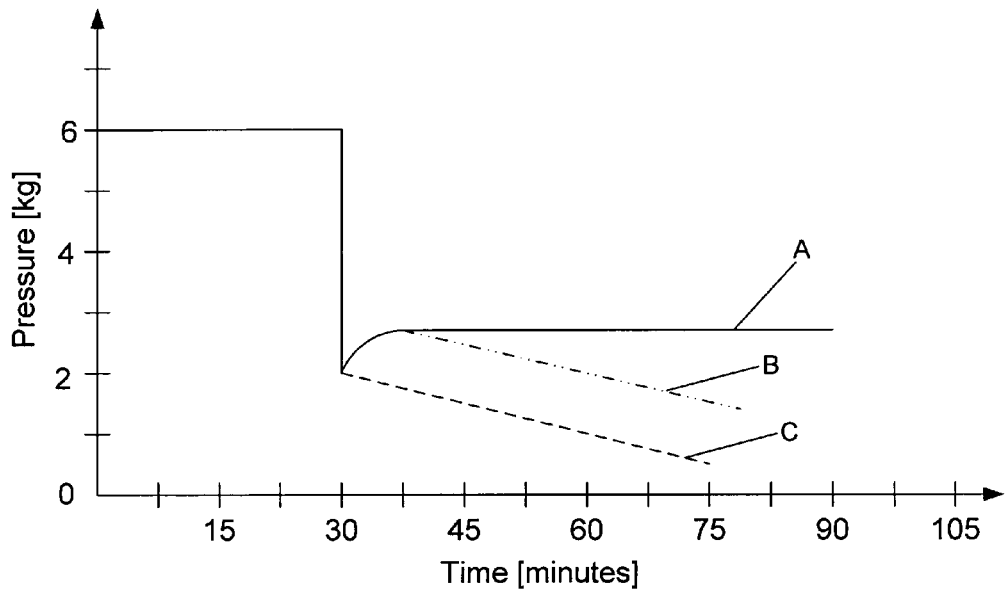
Figure 3:
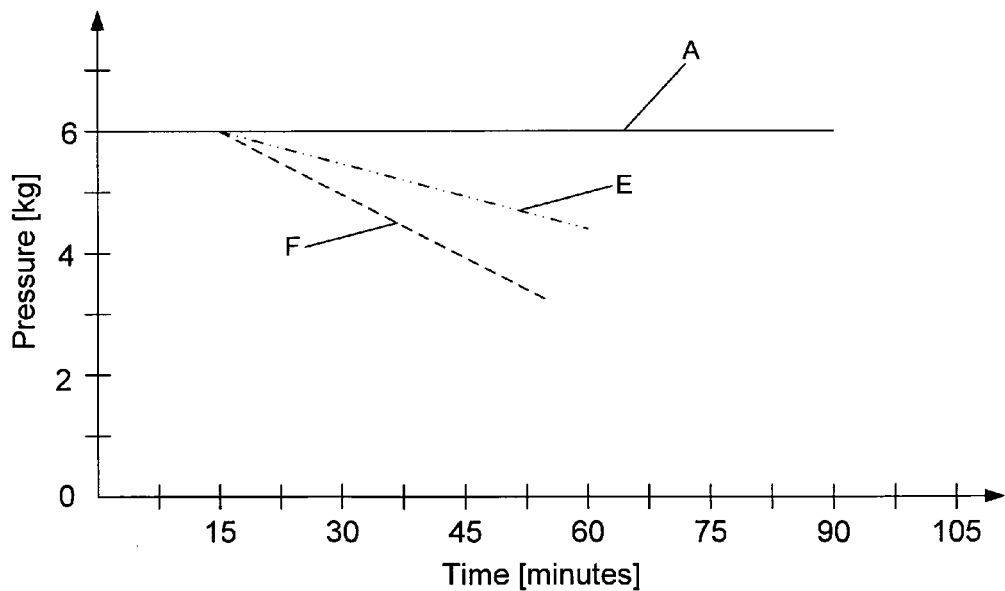

The invention will in the following be described in detail with references to the attached drawings, where FIG. 1 is an example of a system according to the invention, FIG. 2 is an example of how a pressure test according to the invention is performed for expandable pipes, and FIG. 3 is another example of how a pressure test according to the invention is performed for non-expandable pipes.

A principle drawing of an example of a system according to the invention is shown in FIG. 1, where the system is used in connection with the water supply to a building. The system includes an automatic valve arrangement 10 including a valve 11, such as a magnetic ball valve or similar, and an actuator 12, said actuator 12 being arranged to communicate, wired or wireless, with a control device 13 for the system, to control the valve arrangement 10. The valve arrangement 10 is arranged behind an optional main cock 14 on the supply end for a building, but preferably inside the walls of the building. A pressure control arrangement 20, such as a double-acting piston device, is arranged between the valve arrangement 10 and a room 16 having discharge points 17, for example, said double-acting piston device being arranged to increase and decrease the pressure within a closed pipe system between the valve 11 and the discharge points 17 of the pipe system. The figure only illustrates only one distribution course 15 which leads to a room 16 with discharge points 17 in the form of a faucet. Moreover, the system includes a pressure measuring arrangement 21, such as a pressure cell or similar, to measure the pressure in the pipe system at any times, said pressure measuring arrangement 21 can be a separate device or an integral part of the pressure control arrangement 20. Both the pressure control arrangement 20 and the pressure measuring arrangement 21 are connected to the control device 13 via cable or wirelessly. In a pipe system consisting of plastic pipes, no further elements are required to perform testing of the pipe system to reveal leakage (described in further detail below), but if the pipe system consists of copper or steel pipes, for example, an expansion tank 23 or similar is required, as copper and steel pipes cannot expand, and one thus needs an arrangement to allow a difference for measuring within. The expansion tank 23 or similar can be made of an expandable material or a non-expandable material. If the expansion tank 23 or similar is made of an expandable material, it will correspond to the effect from expandable plastic pipes in a pipe system in connection with a test. If the expansion tank 23 or similar is made of a non-expandable material, an alternative test of the pipe system is required, as described in detail below.

Moreover, the system preferably includes arrangements, such as movement sensors 24 or similar, to detect any activity in rooms 16 having discharge point 17. The system do preferably also include manual or automatic switches or similar (not illustrated) which can be used to state whether fixed installations, such as a laundry machine or dishwasher are active, said function can also be performed by for example a remote control.

The control device 13 is provided with means and/or software to control the system and is provided with communication devices. Moreover, the control device 13 is preferably provided with a control panel and/or is arranged to communicate with a remote control for settings and control of the system. The communication devices are arranged to communicate with arrangements to detect activity in rooms 16 with discharge points 17, remote control, manual or automatic switches or similar to determine whether fixed installations are active, and being arranged to communicate with a user and/or security company or similar in connection with alarm notification. Communication with a user, security company or similar can for example be performed by SMS, e-mail, visually, sound and/or light warning on a remote control, control panel or similar, or a combination of these.

The main function of the control device 13 is to perform testing of the pipe system and handle results from these tests by controlling the pressure control arrangement 20 and the valve 11 and provide information from the pressure measuring arrangement 21, to examine if there are any leakages in the pipe system, and to close the valve arrangement 10 if there is a leakage.

The control device 13 can also be arranged to communicate with other control devices, such as power-saving systems or similar, for settings and raise alarms.

The control device 13 is of course provided with internal or external memory, e.g. to store and process values.

The following describes how the system works. The system works substantially from three phases:
 a) operation
 b) testing
 c) error/leakage During operation phase a) the arrangements 24 will state that there is activity in a room 16 with discharge point 17 and/or arrangements to state whether fixed installations, such as laundry machine, dishwasher, filling of a bathtub or similar is in activity, and the valve arrangement 10 will be open and the water supply normal because of the activity in a room or fixed installations are active and water is being or is going to be consumed.

During the testing phase b), the arrangements 24 will state that there is no activity in a room 16 with discharge point 17 and/or the arrangements for stating whether fixed installations, such as laundry machine, dishwasher, filling of bathtub or similar will state that they are inactive, and the valve arrangement 10 is closed and the pressure control arrangements 20 is activated to perform a testing of the pipe system to detect possible leakages. If the system is in phase b) where the valve arrangement 10 is closed, and/or the arrangements 24 indicate activity in a room with discharge points 17 and or the arrangements for indicating whether fixed installations, such as laundry machine, dishwasher, tapping of bathtub or similar indicate activity, the test is interrupted and the valve arrangement 10 is reopened whereupon the system again is in operating phase a). When the means 24 again states that there is no activity in the room 16 with discharge points 17 and/or the arrangements for stating whether fixed installations, such as laundry machine, dishwasher, filling of bathtub or similar states that they are inactive, the system returns to phase b) and the testing can start again.

As mentioned above, the valve arrangement 10 closes during phase b) so that the water is closed in the building. By this an isolated area is obtained that can be subjected to testing by a pressure test. After the valve arrangement 10 is closed, the pressure control arrangement 20 is activated and a pressure test of the pipe system and discharge points can be performed. The then system works from two alternatives, one with a pipe system of expandable pipes, such as plastic tubes, which results in expansion of the pipe wall, or one with a pipe system of non-expandable pipes, such as steel or copper pipes, which give no expansion of the pipe wall.

Reference is now made to FIG. 2, which illustrates an example of a pressure test of a pipe system comprising of plastic tubes. A pipe system has, for example, an operating pressure of 4 kg (operating pressure is the pressure which normally enters the building from the municipal waterworks, a well, pump or similar). In order to perform a test, i.e. when the pipe system is in a passive state and the system is in phase b), as described above, the pressure is initially increased to 1.5 times the operating pressure, i.e. 6 kg in this example, by means of the pressure control arrangement 20 and the pressure is measured continuously by the pressure measuring arrangement 21. This pressure increase must be maintained during a certain period of time to obtain a stable pressure due to the plastic pipes expanding. This period of time is usually within 0-60 minutes and in the example about 30. After the period of time has lapsed, the plastic pipes have expanded and a stable pressure of 6 kg is obtained. The pressure is then rapidly dropped to e.g. 0.5 times the operating pressure, i.e. 2 kg in this example. This pressure will then usually increase to a certain degree since the plastic tubes contract, and after a certain period of time, usually 0-90 minutes, in the example about 60 minutes, the pressure is stable which indicates that pipes and fittings are tight, as shown by curve A. If the pressure does not stabilize, i.e. drops, this indicates a leakage, as shown by curves B and C. If the pressure does drop slowly, as shown by curve B, there is a small leakage, but if it drops rapidly, as shown by curve C, there is a large leakage. Even though curve B and C are linear, it is obvious that they can exhibit any shape.

If the system cannot maintain a stable initial pressure of 6 kg, this also shows that there is a leakage in the system.

For a pipe system of non-expandable pipes, such as copper or steel pipes, but where there is arranged an expansion tank 23 or similar of an expandable material, the same procedure as described above is followed, where the pressure control arrangement 20 initially increases the pressure to e.g. 1.5 times the operating pressure, but simultaneously accumulating a certain volume of water to the expansion tank 23, for example, since the pipes are non-expandable pipes. This accumulated volume which is included in the control device 13, is the same as the volume the system allows before the system considers this to be a leakage. The pipe system with the expansion tank 23 will in this case have the same behavior as a pipe system of expandable pipes, and the expansion tank 23 will to a certain degree increase the pressure in the pipes after the pressure reduction to e.g. 0.5 times the operating pressure has been performed, which results in the same courses as shown in FIG. 2, also for non-expandable pipes as well.

Reference is now made to FIG. 3, which shows an example of a pressure test for a pipe system consisting of non-expandable pipes, such as copper and steel pipes, but having an expansion tank 23 or similar of a non-expandable material. Here the pressure is also initially increased by means of the pressure control arrangement 20 to e.g. 1.5 times the operating pressure, but simultaneously accumulating a given volume of water to the expansion tank 23, as the pipes are non-expandable pipes, and maintaining the pressure stable within a certain period of time. This accumulated volume, which is included in the control device 13, is the same as the one the system accepts before the system considers this to be a leakage. Should the pressure be unstable (shown by curve A) after the initial pressure increase, i.e. drops, a leakage is indicated, as shown by curve E and F. If the pressure drops slowly, as shown by curve E, there is a small leakage, but if it drops rapidly, as shown by curve F, there is a large leakage. Even though the shown curves E and F are linear, it is obvious that they can exhibit any shape.

If it is not possible to obtain a stable initial pressure of 6 kg, it also shows that there is a leakage in the pipe system.

During the pressure test the control device 13 is controlling the pressure control arrangement 20 to achieve the desired pressure increase and optionally the pressure reduction (for expandable pipe systems or non-expandable pipe systems with expandable expansion tanks or similar), acquires the at any time present pressure by means of the pressure measuring arrangement 21, and interprets the measured pressure against predefined parameters to reveal any leakage.

If the interpretation in phase b) indicates leakage, i.e. the pressure in the water circuit drops (as shown in FIG. 2 by curve B and C and curve E and F in FIG. 3, respectively) without any activation of any one of the arrangements 24 or the manual or automated devices, the system enters phase c) leakage/error. Phase c) includes that the control device 13 sends a permanent stop signal to the valve arrangement 10 and raises an alarm by communication with a user, security company or similar.

In other words, the system is arranged in a way so that the water is shut off "at all times" when there are no indications of water consumption in the building and simultaneously performing a continuously testing of the pipe system and discharge points when there is no water consumption to detect possible leakages. The system according to the invention will detect even the smallest leakage due to water cannot be compressed, which makes it possible to detect pressure drops even from very small volumes by this test. The alarm threshold can easily be set in the controller device 13, so that the pressure decrease must exceed a certain level before it results in alarm. This is done to avoid false alarms due to natural pressure deviations.

By means of the system according to the invention it is also possible to discover leakages in toilets and faucets which are dripping or similar, which is an important point in view of water consumption.

Moreover, the system can be arranged to perform testing only in periods without ordinary water consumption, i.e. normal passive periods, for example at night. As mentioned above, the system preferably includes manual or automatic switches to determine whether fixed installations are active, to avoid closure of water then they are active, but this function can also be covered by for example a remote control or a control panel arranged to communicate with the control device.

Other alternatives can be testing when the users leaves the building and for example activates a burglar alarm, which indicates that there are no people in the building and that water is not to be consumed and that testing can be performed. This shows that there are many alternatives for when to perform the pressure test to detect leakages.

The valve arrangement 10 is preferably always closed when there are no indications of water consumption, something which will minimize water damage if a leakage occurs at a point in time when a test is not performed.

The system is preferably also arranged so that if a power failure occurs as the valve arrangement 10 is closed, the arrangement is opened to provide water supply to the user, provided that there are no indications in the system if any leakages. Alternatively or additionally, the system is arranged so that if the valve arrangement 10 is closed as a power failure occurs, the valve arrangement 10 can be opened or closed manually.

The system can also preferably be provided with backup power supply (such as batteries), so that the system works in a certain period of time after a power failure.

As mentioned initially, it has been an increasing problem with leakages caused by poor plumbing. The system according to the invention can then be introduced at an early stage of the construction process and in this way assist the plumbers and contractors in detecting failures/leakages at an early stage, for example prior to acceptance of water areas or similar. There is an increasing requirement to system documentation, and the system according to the invention can therefore be used to document that a delivered system is without faults and defects.

Even though it above is described an example on the basis of the water supply for a building it is obvious that the system also can be utilized in other areas, such as within the industry to detect leakage in connection with process industry, where there are used incompressible fluids.

Modifications

Even though it has been described a pressure control arrangement and a pressure measurement arrangement for the entire pipe system, it is obvious that a pressure control arrangement and a pressure measurement arrangement can be arranged at every single circuit, which is an option for larger buildings, such as factory buildings and similar. In these cases a common control device can be used.

The control device can be arranged to communicate with other control devices, such as power-saving systems or similar, so that the users is confronted only with one control device.

It is also obvious that the control device as a whole can be integrated in existing control devices present in a building.

The system according to the invention can also be used to check other types of pipe systems before they are taken into use, for example central heating plants with radiators, processing plants or similar.

As mentioned above, the system is arranged to communicate with external devices. Other examples of external devices than those mentioned above are flow meters/water gauges. By that the system is arranged to communicate with a flow meter, the system is capable of measuring consumption and from this analyze when it normally is no water consumption and use this information to determine when a pressure test is to be performed. The use of a flow meter can also be used to close the valve arrangement if irregular high water consumption occurs. Irregular high water consumption, for example in a period of time without normal water consumption, may indicate leakage whereupon the valve arrangement can be closed and a pressure test performed.

Said flow meter can also be used in addition to/or instead of arrangements to reveal whether there is activity in a room with discharge points or whether fixed installations are active. If the flow meter shows that there is consumption over a very long period of time, this may indicate a leakage. Then the use of a flow meter can provide better information basis for the system according to the invention.

The system can also include arrangements for temperature measurement. Temperature will affect how much the pipes expand. It can thus be useful for the system according to the invention to provide information about room temperature and/or water temperature, which can be used to adapt the pressure test parameters for the system.

The invention claimed is:

1. System of leakage control and/or testing of a pipe system and discharge points for incompressible fluids, said system comprising
   one or more automatic valve arrangements (10) arranged in a pipe system in connection with a fluid supply to a processing plant or building comprising rooms (16) having one or more discharge points (17) for opening and closing the fluid supply,
   a control device (13) provided with communication devices, and arrangements (24) for detecting any activity in a room (16) with discharge point (17) or the processing plant, and
   one or more pressure control arrangements (20) arranged between the automatic valve arrangements (10) and the processing plant or room (16) with discharge points (17), said pressure control arrangement(s) (20) being arranged to increase or decrease the pressure in the pipe system, and
   one or more pressure measuring arrangements (21) to measure the pressure in the pipe system at any times, said pressure measuring arrangement(s) (21) being a separate device or an integral part of the pressure control arrangement (20).

2. System according to claim 1, characterized in that the system includes a remote control and/or manual or automatic switches or similar, said remote control or switches or similar being arranged to detect whether fixed installations such as a laundry machine, dishwasher, processing plants or similar are active.

3. System according to claim 1, characterized in that the controller device (13) is provided with means and/or software to control the system, provided with a control panel and/or is arranged to communicate with a remote control for settings and control of the system.

4. System according to claim 1, characterized in that the controller device (13) is arranged to communicate with a user and/or security company or similar in connection with raising an alarm, by means of communication arrangements such as via SMS, e-mail, visual and/or light warning on remote control, control panel or similar, or a combination of these.

5. System according to claim 1, characterized in that the system includes an expansion tank (23) or similar formed of an expandable or non-expandable material.

6. System according to claim 1, characterized in that the system includes external arrangements to measure flow and/or temperature.

7. Method of controlling leakage and/or testing of pipe systems and discharge points for incompressible fluids, to reveal any leakages in a pipe system in a processing plant or a building having rooms with discharge points, by means of an automatic valve arrangement arranged in connection with a fluid supply, and at least one pressure control arrangements and at least one pressure measuring arrangements, characterized in that the method comprises the steps of:
  a) continuously monitoring any activity in rooms with discharge point or indications of any active fixed installations or processing plants, which indicates fluid consumption,
  b) if there is no indication of fluid consumption, close the valve arrangement,
  c) increase the pressure to a pressure substantially above the operating pressure and obtain a stable pressure during a certain period of time by means of the pressure control arrangement(s), and continuously measuring the pressure in the pipe system by means of the pressure measuring arrangement(s),
  d) interpret the measured pressure in relation to predefined parameters to reveal any leakage,
  e) if the interpretation in step d) indicates the presence of a leakage closing the valve arrangement and raising an alarm.

8. Method according to claim 7, characterized in that step c) includes a reduction of the pressure in the closed circuit between the valve arrangement and the discharge points of the pipe system by means of the pressure control arrangement (s), to a pressure substantially below the operating pressure, and continuously measuring the pressure in the pipe system by means of the pressure measuring arrangement(s).

9. Method according to claim 7, characterized in that step e) includes notification of the user, security company or similar about leakage.

10. Method according to claim 7 characterized in that the steps a)-e) includes returning to step a) and setting the valve arrangement in an open position if activity occur in rooms with discharge points, activity by fixed installations, such as laundry machine, dishwasher or similar, or activity in processing plants.

11. Method according to claim 7, characterized in that the method includes a continuous repetition of steps a)-e) or execution of steps a)-e) according to predefined conditions, such as predefined periods of time during a day, etc.

12. Method according to claim 7, characterized in that step e) includes interpretation of information from arrangements for flow and/or temperature measurement.

13. Method according to claim 7, characterized in that step e) includes closing the valve arrangement only for a certain period of time during which steps a)-d) are repeated several times to provide better basis for interpretation prior to raising alarm and performing permanent closing of the valve arrangement.

* * * * *